(12) United States Patent
Pousti

(10) Patent No.: US 8,073,774 B2
(45) Date of Patent: Dec. 6, 2011

(54) BILLING SYSTEM AND METHOD FOR MICRO-TRANSACTIONS

(75) Inventor: Michael Pousti, San Diego, CA (US)

(73) Assignee: SMS.ac, Inc., San Diego, CA (US)

( * ) Notice: Subject to any disclaimer, the term of this patent is extended or adjusted under 35 U.S.C. 154(b) by 1490 days.

(21) Appl. No.: 11/446,973

(22) Filed: Jun. 6, 2006

(65) Prior Publication Data

US 2006/0276171 A1 Dec. 7, 2006

Related U.S. Application Data

(60) Provisional application No. 60/687,663, filed on Jun. 6, 2005, provisional application No. 60/689,641, filed on Jun. 10, 2005.

(51) Int. Cl.
*G06Q 40/00* (2006.01)
(52) U.S. Cl. .................. 705/40; 705/39; 705/2; 705/77; 705/35; 705/902; 377/14
(58) Field of Classification Search .................... 705/40, 705/2, 30, 77
See application file for complete search history.

(56) References Cited

U.S. PATENT DOCUMENTS

| | | | |
|---|---|---|---|
| 5,566,291 A | 10/1996 | Boulton et al. | |
| 7,283,981 B2 | 10/2007 | Solem | |
| 7,440,922 B1 * | 10/2008 | Kempkes et al. | 705/39 |
| 2001/0054003 A1 | 12/2001 | Chien et al. | |
| 2002/0107795 A1 | 8/2002 | Minear et al. | |
| 2002/0143634 A1 | 10/2002 | Kumar et al. | |
| 2002/0194126 A1 | 12/2002 | Randell et al. | |
| 2003/0200184 A1 | 10/2003 | Dominguez et al. | |
| 2004/0006539 A1 | 1/2004 | Royer et al. | |
| 2004/0043753 A1 | 3/2004 | Wake et al. | |
| 2004/0054632 A1 | 3/2004 | Remy | |
| 2004/0181591 A1 | 9/2004 | Yu et al. | |
| 2004/0267618 A1 | 12/2004 | Judicibus et al. | |
| 2004/0267663 A1 | 12/2004 | Karns et al. | |
| 2005/0086309 A1 | 4/2005 | Galli et al. | |

(Continued)

FOREIGN PATENT DOCUMENTS

WO    WO 03071464 A1 *   8/2003

OTHER PUBLICATIONS

MilliCent Micropayment System—Product Review Mar. 1998. Retrieved online Jul. 25, 2011. (http://sellitontheweb.com/blog/millicent-micropayment-product-review/).*

(Continued)

*Primary Examiner* — James A Reagan
(74) *Attorney, Agent, or Firm* — Procopio Cory Hargreaves & Savitch LLP; Noel C. Gillespie

(57) ABSTRACT

Billing a customer through an intermediary billing system for a transaction by receiving, at the intermediary billing system, a transaction request associated with a transaction amount and a customer identification code, validating, in the intermediary billing system, the transaction request by determining whether the customer identification code corresponds to a customer that is registered with the intermediary billing system, and sending, in the case that the transaction request is valid, a billing event trigger associated with the customer identification code to an external billing mechanism, the billing event trigger representing the transaction amount.

10 Claims, 7 Drawing Sheets

U.S. PATENT DOCUMENTS

| | | |
|---|---|---|
| 2005/0240943 A1 | 10/2005 | Smith et al. |
| 2005/0289047 A1 | 12/2005 | Oliver et al. |
| 2006/0020783 A1 | 1/2006 | Fisher |
| 2006/0026105 A1 | 2/2006 | Endoh |
| 2006/0080238 A1 | 4/2006 | Nielsen |
| 2006/0200420 A1 | 9/2006 | Osada |
| 2006/0234698 A1 | 10/2006 | Fok et al. |
| 2006/0235796 A1 | 10/2006 | Johnson et al. |
| 2006/0253335 A1* | 11/2006 | Keena et al. ............ 705/26 |
| 2006/0258397 A1 | 11/2006 | Kaplan et al. |
| 2006/0259427 A1 | 11/2006 | Randell et al. |
| 2006/0276171 A1 | 12/2006 | Pousti |
| 2006/0277144 A1 | 12/2006 | Ranzini et al. |
| 2007/0067297 A1* | 3/2007 | Kublickis .................. 707/9 |
| 2007/0244811 A1 | 10/2007 | Tumminaro |
| 2007/0255620 A1 | 11/2007 | Tumminaro |
| 2007/0255652 A1 | 11/2007 | Tumminaro |
| 2007/0265972 A1 | 11/2007 | Tsutsui |
| 2007/0288370 A1 | 12/2007 | Konja |

OTHER PUBLICATIONS

ISA, International Search Report—PCT/US06/21836, Aug. 17, 2007.

International Search Report for PCT/US07/85643 mailed May 13, 2008.

Notice of Allowance issued in related U.S. Appl. No. 11/516,921 dated Aug. 23, 2010 (12 pages).

International Search Report for PCT/US07/85643 mailed May 13, 2008 (8 pages).

International Search Report for PCT/US2008/057708 mailed Jun. 23, 2008 (12 pages).

International Search Report for PCT/US2008/053070 mailed Aug. 19, 2008 (9 pages).

* cited by examiner

BILLING SYSTEM AND METHOD FOR MICRO-TRANSACTIONS

CROSS-REFERENCE TO RELATED APPLICATIONS

The present application claims the benefit of priority under 35 U.S.C. §119 from U.S. Provisional Patent Application Ser. No. 60/687,663 entitled "METHOD AND SYSTEM BY WHICH MICRO TRANSACTIONS ARE PROCESSED," filed on Jun. 6, 2005, and U.S. Provisional Patent Application Ser. No. 60/689,641 entitled "METHOD AND SYSTEM BY WHICH MICRO PAYMENT TRANSACTIONS OCCUR VIA A WIRELESS DEVICE AND/OR INTERNET PORTAL," filed on Jun. 10, 2005, both of which are incorporated herein by reference in their entirety for all purposes.

FIELD OF THE INVENTION

The present invention concerns the automated processing of transactions, including small transactions known as micro-transactions. In particular, the invention concerns the use of an intermediate billing system that acts on behalf of third party providers of content or services by interacting with various external billing mechanisms to effectuate transactions between such third party providers and their customers.

BACKGROUND OF THE INVENTION

While credit card use and automatic credit card billing is a common way to conduct business transactions in many countries, they are not necessarily the best way in some situations. In particular, there are many users of the internet that do not have access to a credit card or do not want to use their credit card for an internet based transaction out of security concerns. Many such users most likely have a mobile phone or mobile device, and it would be more easy and efficient to have a mechanism for billing the user for transactions through the user's pre-existing account with the mobile carrier associated with the user's mobile phone number. In addition, the use of a credit card is economically viable only if the transaction amount, or a volume of such transactions, exceeds a particular amount that depends on the underlying efficiency of the billing and collecting system implemented by the merchant and by the credit card provider. Currently, mobile phone carriers routinely bill users for small transactional amounts, such as a one minute call, or portion thereof, and are able to bill and collect for these small transactions while making a profit. These small transactions are referred to as micro-transactions and, in terms of U.S. currency, can be as small as a few pennies, although larger transactions occur as well.

Retailers or vendors, such as internet commercial websites, may desire to provide their respective content or services to mobile phone users via the internet or directly through the user's mobile phone, and bill the user for such content or services as micro-transactions. Currently, a retailer or vendor will find it very difficult and inefficient to bill and collect for such a micro-transaction because the retailer/vendor would need to negotiate and enter into a contractual relationship with the mobile phone carrier in order to bill the mobile phone user subscribed to that carrier. The process is further complicated by the fact that the universe of customers with mobile phones use different mobile phone carriers. Accordingly, the retailer/vendor would need to enter into contractual relationships with many different mobile phone carriers in order to be able to provide a mobile phone based micro-transaction billing option to the desired global market of mobile phone users.

A retailer or vendor can try to use billing mechanisms other than mobile carriers, such as prepaid card services, web-based payment services, bank account and credit card billing services, and other such external billing mechanisms to support customer transactions. However, in such examples, the same problem still exists for the vendor/retailer because they would still need to have pre-existing relationships with all of the various external billing mechanisms that their various customers wish to use for payment of transactions.

Thus, there exists a need for a system and method that allows retailers/vendors to easily conduct transactions, many of which may be micro-transactions, with a global market of customers, where the transactions are easily billable through a single intermediate billing system which can effectuate the transaction through a wide variety of external billing mechanisms on behalf of the retailer/vendor, thereby eliminating the need for the retailer/vendor to individually establish a pre-existing relationship with each of the wide variety of external billing mechanisms.

SUMMARY OF THE INVENTION

The present invention solves the foregoing problems by providing a method and system that uses a single intermediate billing system to effectuate transactions between retailers/vendors and their customers through a wide variety of external billing mechanisms, without the need for the retailer/vendor to individually establish a pre-existing relationship with each of the wide variety of external billing mechanisms.

In one embodiment, the invention is directed to a method and system for billing a customer through an intermediary billing system for a transaction, by receiving, at the intermediary billing system, a transaction request associated with a transaction amount and a customer identification code, validating, in the intermediary billing system, the transaction request by determining whether the customer identification code corresponds to a customer that is registered with the intermediary billing system, and sending, in the case that the transaction request is valid, a billing event trigger associated with the customer identification code to an external billing mechanism, the billing event trigger representing the transaction amount.

In another embodiment, the invention is directed to a method and system for billing a customer through an intermediary billing system for a transaction between the customer and a third party provider, by receiving, at the intermediary billing system, a registration request to register the customer, registering the customer in the intermediary billing system by providing a mobile phone number of the customer to the intermediary billing system, assigning a customer identification code to the customer, the customer identification code being shared with the third party provider, and associating the mobile phone number of the customer with the customer identification code assigned to the customer, receiving, at the intermediary billing system, a billing request from the third party provider, the billing request including a product identification code corresponding to a product associated with the transaction between the customer and the third party provider, a customer identification code assigned to the customer and a provider identification code corresponding to the third party provider, validating, in the intermediary billing system, the billing request by determining whether the customer identification code corresponds to a customer that is registered with the intermediary billing system, and by determining whether the provider identification code corresponds to a valid third party provider, and sending, in the case that the billing request is validated, at least one message from the intermediary billing system to a mobile phone number associated with the customer identification code, the at least one message representing a billing value that corresponds to the product identification code.

In another embodiment of the invention, a method and system is provided for billing a customer through an intermediary billing system for a transaction between the customer and a third party provider, by receiving, at the intermediary billing system, a transaction activation request from the third party provider to activate a customer for the transaction associated with a product offered by the third party provider, the customer being automatically directed from the third party provider to the intermediary billing system, prompting, by the intermediary billing system, the customer to confirm an instruction to proceed with the transaction, sending, in the case that the customer confirms the instruction to proceed with the transaction, at least one message from the intermediary billing system to a mobile phone number associated with a customer identification code for the customer, the at least one message representing a billing value that corresponds to the product, generating, in the intermediary billing system, an encrypted verification code in association with the customer identification code for the customer, installing the encrypted verification code on a web browser application of the customer (for browsing web pages on the internet), and automatically directing the customer from the intermediary billing system to the third party provider, receiving, at the intermediary billing system, a verification code validation request containing a returned encrypted verification code and a customer identification code from the third party provider, and validating, in the intermediary billing system, whether the returned encrypted verification code is the same as the encrypted verification code sent from the intermediary billing system to the third party provider for that customer identification code, and sending, from the intermediary billing system, a validation response to the third party provider, the validation response containing an error code in the case that the returned encrypted verification code is not valid, and containing a valid confirmation code in the case that the returned encrypted verification code is valid, wherein the third party provider enables the customer to access the product on the basis of the validation response received by from the intermediary billing system.

In this manner, the present invention provides that an efficient and timely billing system that utilizes mobile text messages to bill customers for transactions between the customers and third-party providers of content or services, without the need for a third-party provider to have any relationship or interaction with the mobile phone carrier of the customer.

This brief summary has been provided so that the general nature of the invention may be understood quickly. A more complete understanding of the invention can be obtained by reference to the following detailed description thereof in connection with the attached drawings. It is to be understood that embodiments of the invention other than that provided in the description below and the accompanying drawings may be utilized and that changes may be made without departing from the scope of the present invention.

DETAILED DESCRIPTION OF THE INVENTION

As mentioned above, the present invention is a method and system that utilizes an intermediary billing system in conjunction with one or more external billing mechanisms for supporting transactions between customers and third-party providers of content or services, without the need for a third-party provider to have a relationship or interaction with any of the external billing mechanisms.

Figure 1:
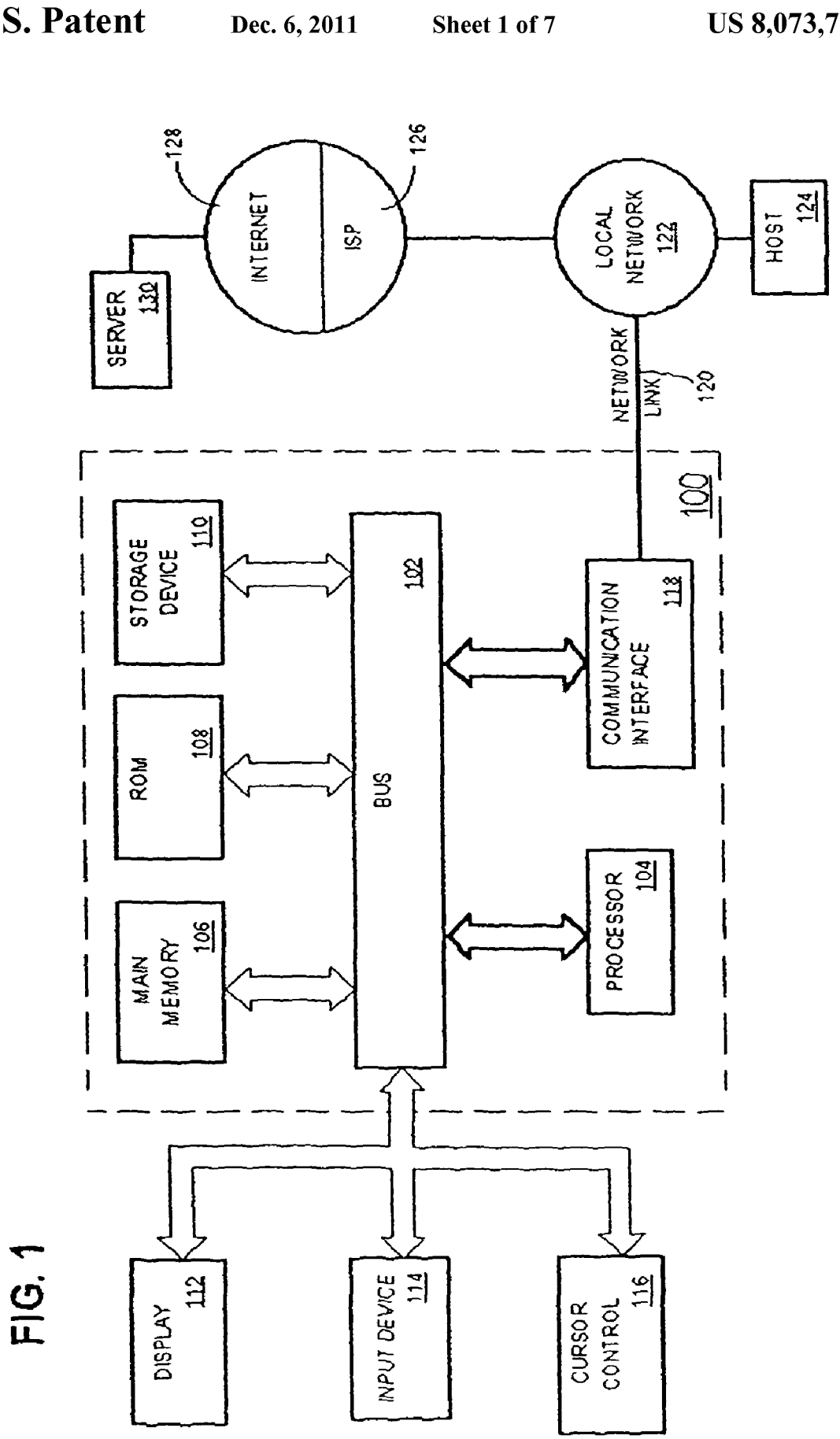
FIG. 1 is a block diagram of a computer system with which the present invention may be practiced, according to one embodiment of the invention.

FIG. 1 is a block diagram of an exemplary computer system with which one embodiment of the present invention may be practiced. As seen in FIG. 1, computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 operates in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave. Of course, other forms of computing systems may be used to implement the present invention.

Figure 2:
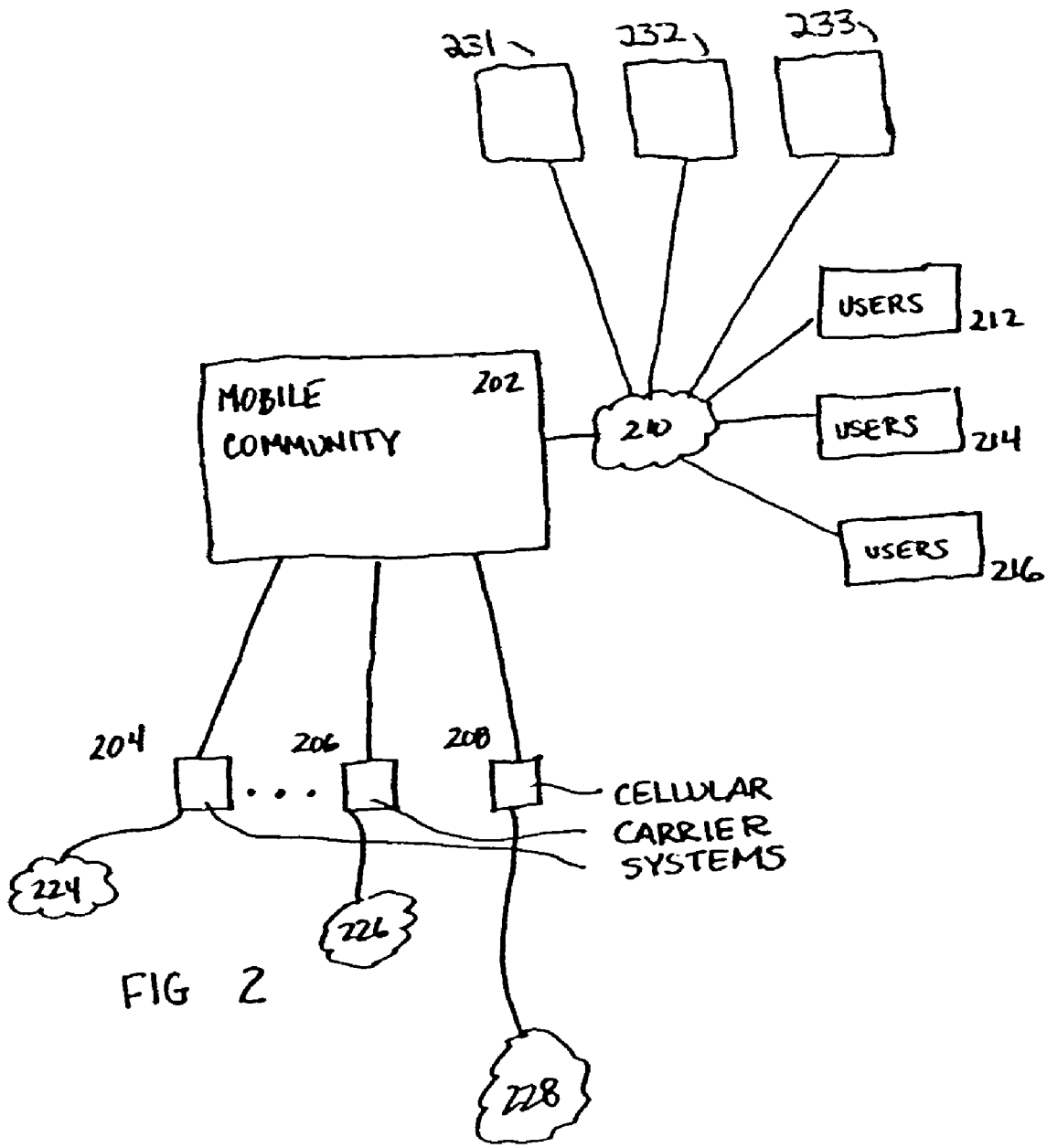
FIG. 2 is a block diagram of a mobile community environment in which the invention may be practiced, according to one embodiment of the invention.

FIG. 2 is a block diagram of a mobile community environment in which the invention may be practiced according to an exemplary embodiment. FIG. 2 depicts a block diagram of a computer-based mobile community platform 202. Mobile community platform 202 can be implemented in the computing system show in FIG. 1, or some other form of computing system. As seen in FIG. 2, users 212, 214, 216 can connect to the mobile community platform 202 via a network or similar communications channel 210. In an exemplary embodiment, network 210 is the internet by which users 212, 214 and 216 can access internet-enabled applications and websites, such as third party providers 231, 232 and 233. In this regard, third party providers 231, 232 and 233 can be websites that provide only information, or may be commercial websites that offer a product, such as access to premium content or services, for purchase by the user, whereby the user is provided with access to the product after opting-in (purchasing) the product from that particular website. In addition, third party providers 231, 232 and 233 can be internet-enabled applications such as a software application that is enabled to access the internet and that can provide content or services to the user of the software application for a price. For example, a software game being executed on a user's computer, or an internet-enabled game device, may allow the user to access the internet in order to purchase additional features of the game to be downloaded or "premium" information about how to play the game for a price. It can be appreciated that a third party provider can be any type of application, game, product or service that is internet-enabled and that offers additional product (software, content, information, or services) to the user for a price. Any such third party provider can maintain a website to which the user is directed when the user elects to purchase a product from the third party provider.

Third party providers 231, 232 and 233 are maintained and operated by known means and can be implemented in a computing system such as that shown in FIG. 1, or other known types of networked computing environments, such as a server, or combination of computers and servers. By means of the connection with mobile community platform 202, a user (e.g., 212) may create a profile page or "home page" supported and maintained by mobile community platform 202 that the user can personalize. This profile page can include various files and content that the user wants to share with other members of the mobile community platform 202.

The user's profile page may include a hierarchy of pages, some of which are for public view and some of which have restrictions on viewing. For example, the mobile community platform 202 can be logically organized into neighborhoods such as "friends", "family", "workplace", "dog owners", etc. Users 212, 214, 216 can belong to these different neighborhoods and share different pages with the members of the different neighborhoods.

As seen in FIG. 2, mobile community platform 202 connects with various mobile carrier systems 204, 206, 208, each of which has an associated community of mobile phone subscribers, 224, 226 and 228. In this regard, each of mobile carrier systems 204, 206, 208 is a carrier network and system for supporting mobile devices including mobile phones and other mobile devices such as personal device assistants (pda). Each mobile carrier system is generally a wireless network provider, which can be cellular, PCS, or other wireless spectrum. Users 212, 214, 216 of the mobile community platform 202 are also subscribers of one or more of the various mobile carriers, which support the mobile phones, or other mobile devices, of users 212, 214, 216. In this way, users 212, 214, 216 of mobile community platform 202 can access other users' profile pages through the computer-based platform of mobile community platform 202, and they can also access the subscribers 224, 226 and 228 of the various mobile carrier systems 204, 206, and 208 who also belong to mobile community platform 202.

A significant benefit of the architecture depicted in FIG. 2, is that the mobile community platform 202 has pre-existing contractual relationships with the various mobile carrier systems 204, 206, 208 for accessing subscribers through each carrier systems and for billing subscribers through their respective carrier system for content and services purchased by the subscriber through mobile community platform 202. As is known in the art, the mobile carrier systems 204, 206, 208 provide text messaging and also premium text message functionality. Such messages are sent via the mobile carrier's infrastructure to its mobile subscribers and, internal to the mobile carrier's infrastructure, the sending of such a message generates a billing event according to a particular tariff rate, which then is added to the subscriber's bill from that mobile carrier.

When mobile community platform 202 sends a message via a mobile carrier system (e.g., 204), it is billing the subscriber-recipient of the message using the existing billing system of that mobile carrier. The billing event is often a micro-transaction of a small monetary amount (e.g., less than one dollar). Thus, a user (e.g., 212) of the mobile community platform may purchase a service or content within mobile community platform 202 and be billed for those transactions through that user's mobile carrier service account. The present invention provides for such micro-transaction billing support through mobile community platform 202 for a transaction between a user (e.g., 212) and a third party provider (e.g., 231) which is external to mobile community platform 202. In this manner, a third party provider need only communicate with mobile community platform 202 to conduct transactions with users, and does not require any affiliation or agreement with the various mobile carrier systems of the users.

Figure 3:
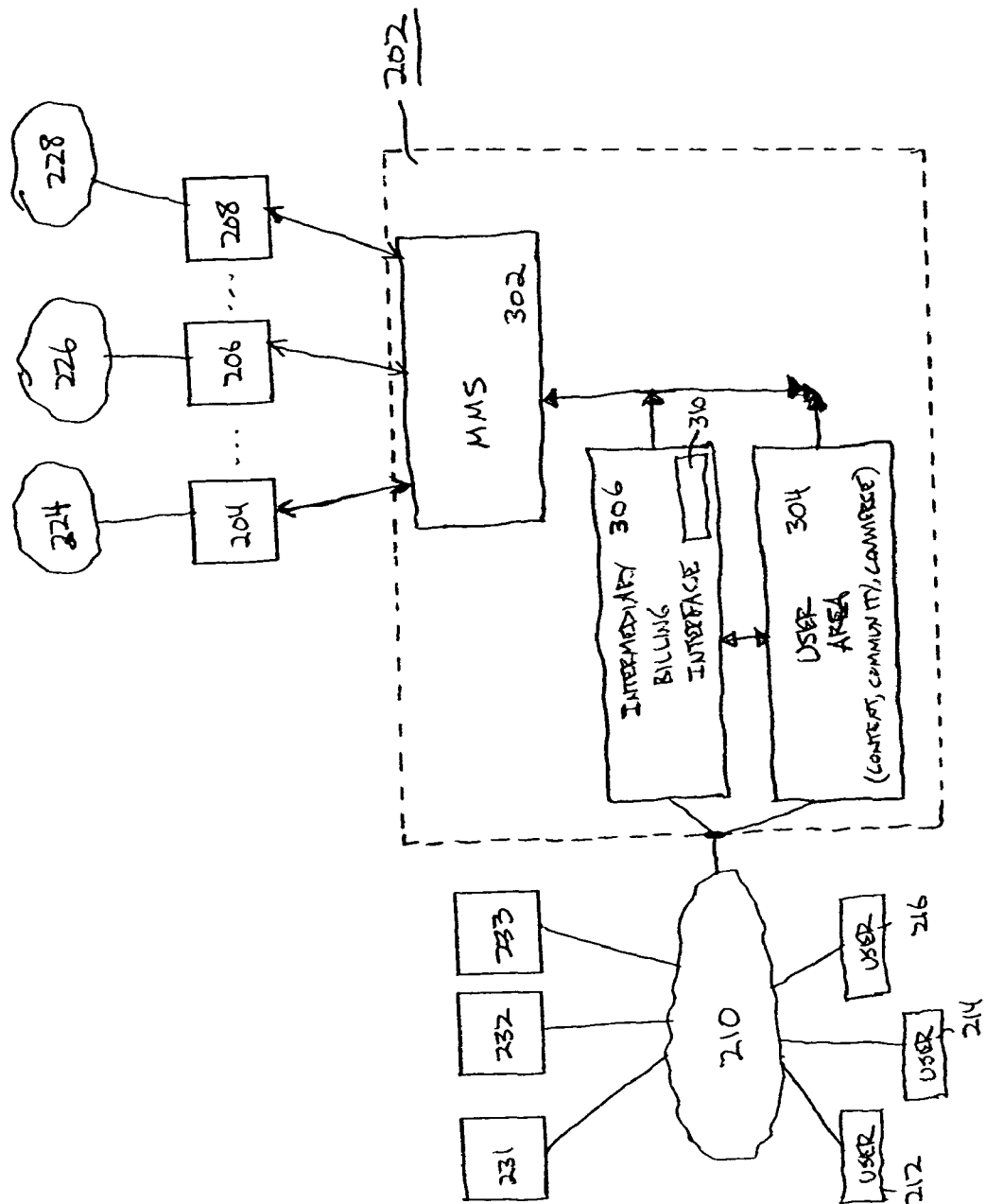
FIG. 3 is a block diagram providing a detailed view of the mobile community platform shown in FIG. 2.

FIG. 3 depicts a more detailed view of mobile community platform 202. As mentioned above, mobile community platform 202 can be used to conduct micro-transactions in which a mobile carrier's billing system is used by mobile community platform 202 to automatically bill the user for each micro-transactions with a third party provider, without the need for a negotiation or contract between the third party provider and the mobile carrier. An example of this feature is a third party provider that operates a website which offers sports score updates to users of mobile community platform 202 for a predetermined price, while taking advantage of the billing arrangements already in place between mobile community platform 202 and the mobile carriers 204, 206, 208. Of course, a third party provider may provide other types of content, products and services to users of mobile community platform 202.

Turning to FIG. 3, mobile community platform 202 includes multimedia messaging system 302, user area 304, which supports content, community and commerce functions for the users, including website interface for users to mobile community platform 202, and intermediary billing interface 306. The details of these different components are more fully explained below.

As noted earlier, users 212, 214, 216 can visit user area 304 of mobile community platform 202 in order to participate in an online-based community of users that includes various communication, content and commerce opportunities. The user accesses a website of user area 304 through the user's web browser that may be hosted on a laptop or desktop computer, or, in the alternative, even on the user's mobile device such as a PDA or mobile phone. In this regard, user area 304 includes a web server that communicates with users 212, 214, 216 and includes a data store (database) of user information and other content. With these resources, mobile community platform 202 is able to present a profile page ("home page") to a user (e.g., 212) that reflects a set of content, information and products associated with, and desired by, that particular user. This set of content, information and products is not maintained on the local computer being used by the user 212 but, rather, is maintained and managed by the computing environment of mobile community platform 202. Although not explicitly depicted in FIG. 3, one of ordinary skill will recognize that there are numerous functionally equivalent techniques to create, manage, store and serve user information, user profiles, user content, software tools and other resources within the user area 304. Included in these techniques are methods to ensure security, data integrity, data availability and quality of service metrics.

Multimedia messaging system (MMS) 302 includes applications for connecting with and communicating with the multiple different mobile carriers 204, 206, 208 that have been partnered with mobile community platform 202. MMS 302 is configured to generate message requests in the appropriate format for each of the mobile carriers 204, 206, 208 including tariff information that determines the amount for which the recipient of the message will be charged. Upon receipt of the message request, the mobile carriers 204, 206, 208 will use the information in the request to generate an appropriate message to the intended recipient/subscriber of the mobile carrier and then bill the recipient/subscriber's mobile service account for that specified amount. In this manner, mobile community platform 202 uses the mobile carriers to bill user/subscribers of the mobile carriers for transactions conducted through mobile community platform 202.

The MMS 302 communicates with the user area 304, such that users of mobile community platform 202 can advantageously use the connectivity between MMS 302 and the mobile carriers 204, 206 and 208 in order to send messages to subscribers of any of the mobile carriers 204, 206, 208. The messages may be SMS messages, MMS messages, or other known message formats or subsequently developed message formats. Some of these messages may have zero tariff and, therefore do not generate a bill to the recipient/subscriber (other than the underlying charges implemented by the mobile carrier) and others may have non-zero tariffs resulting in a billing event for the recipient/ subscriber.

Intermediary billing interface 306 provides an interface between third party providers 231, 232 and 233 and mobile community platform 202 for enabling transactions between such third party providers and users 212, 214 and 216, through the use of sending messages to the users as a billing mechanism. In this regard, intermediary billing interface 306 is accessed by the third party providers via network connection 210 (internet). As seen in FIG. 3, intermediary billing interface 306 is in communication with user area 304, both of which are in communication with MMS 302. Accordingly, intermediary billing interface 306 can access user information from user area 304, such as whether the user is registered and verified for billing through their mobile phone number, as discussed more fully below. Intermediary billing interface 306 can interface with user area 304 to communicate with a user, such as via webpages supported by user area 304, for purposes of registering the user with mobile community platform 202 and verifying the user for billing of transactions related to a product offered through a third party provider, as also discussed in more detail below.

As seen in FIG. 3, intermediary billing interface 306 also includes local database 310 which is used by intermediary billing interface 306 to store customer identification codes, third party provider identification codes, and other information for implementing the present invention. Accordingly, third party providers 231, 232 and 233 can interact with all users of the mobile community platform 202 whereby billable transactions with users 212, 214, 216 are automatically billed to the users via the billing systems of their mobile carriers 204, 206, 208. Furthermore, and importantly, this capability is available to the third party providers without requiring them to negotiate or contract with any of the mobile carriers for billing arrangements, or to worry about how to communicate with a particular mobile carrier's systems and resources. The third party providers seamlessly take advantage of the unified set of connectivity and billing arrangements that exist between mobile community platform 202 and the mobile carriers 204, 206, 208. As a result, the third party providers may conduct transactions with users/subscribers of any of a variety of different mobile carriers without easily and efficiently through mobile community platform 202.

Figure 4:
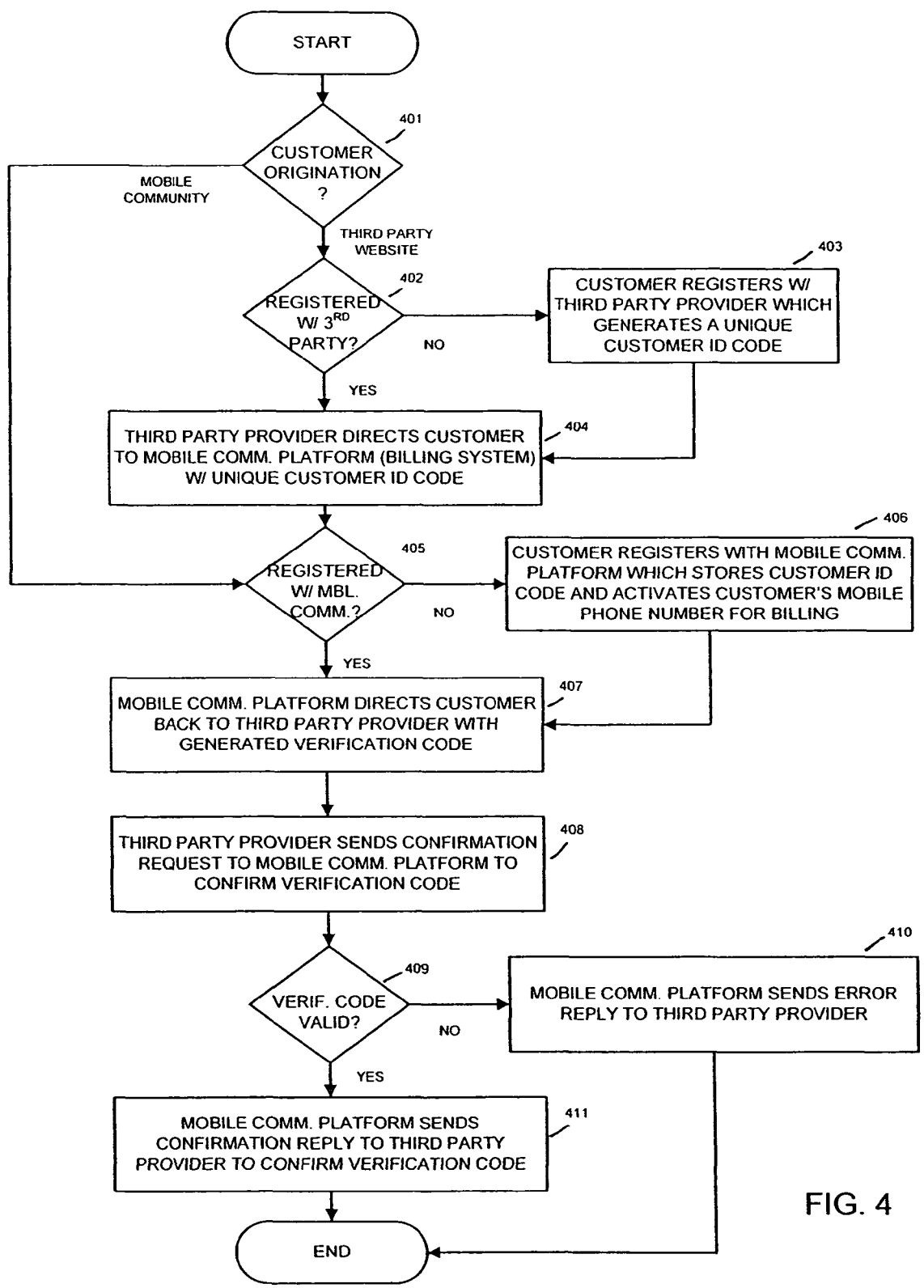
FIG. 4 is a flowchart for explaining the registration and activation of a customer for transaction billing, according to one embodiment of the invention.

FIG. 4 is a flowchart that provides an exemplary depiction of the registration and activation of a customer for transaction billing in one embodiment of the invention. The process starts in FIG. 4 and proceeds to step 401 in which it is determined whether the customer (e.g. one of users 212, 214 and 216) is initiating a transaction for a product at a third party provider, such as one of third party providers 231, 232 and 233, or is initiating a transaction for a product offered by the third party provider at mobile community platform 202, which acts as the intermediary billing system in either case. If the customer is initiating the transaction at mobile community platform 202, then the process proceeds to step 405 which is discussed further below. On the other hand, if the customer is initiating the transaction at the third party provider, then the process proceeds to step 402 in which the third party provider determines if the customer is already registered as a customer with the third party provider. If the customer is already registered with the third party provider, then the process proceeds to step 404. If not, then the process proceeds to step 403 in which the customer registers with the third party provider, such as by providing the customer's name and contact information, and in which the third party provider generates a unique customer identification code corresponding to that customer. Of course, it should be appreciated that the third party provider can use any form of registration process and may not necessarily require the customer to provide any specific information, in which case the third party provider simply generates and assigns a unique customer identification code to that customer. In this regard, the third party provider maintains a database of its registered customers, and their corresponding customer identification numbers and information. The customer identification number will be used in the invention for common tracking of the same customer between the third party provider and the intermediary billing system of mobile community platform 202.

In step 404, the third party provider directs the customer to mobile community platform 202 along with a registration request to register and activate the customer, the request including the customer identification code for the customer. Next, in step 405, the registration and activation steps for the customer begin by the mobile community platform 202 (intermediary billing system) determining if the customer is already registered as a member of mobile community platform 202. If the customer is already registered with mobile community platform 202, then the process proceeds to step 407. If not, then the process proceeds to step 406 in which the customer registers with mobile community platform 202, such as by providing the customer's name and contact information, including the customer's mobile phone number, which is used by mobile community platform 202 in the invention to bill the customer for the transaction.

If it was determined in step 401 that the customer is originating the transaction at mobile community platform 202, then mobile community platform 202 also generates a unique customer identification code for the customer. Also in the registration process, mobile community platform 202 stores the customer identification code for the customer in a database of registered customers, along with related information, maintained in mobile community platform 202, and activates the customer's mobile phone number for transaction billing as described below.

Continuing with the registration and activation process, the mobile community platform 202 generates a verification code for the registration/activation of the customer, and directs the customer back to the third party provider along with the verification code, the customer identification code, and possibly other information, in step 407. Next, in step 408, the third party provider sends a verification code validation request to mobile community platform 202, the request including the verification code for the customer, to make sure that the third party provider and mobile community platform 202 are in agreement on the customer identification code to be used for the customer, and that the customer is registered and activated for the transaction in both the third party provider and the mobile community platform 202. In this regard, the term "activated" means that the mobile community platform 202 has enabled the customer associated with the assigned customer identification code to be billed for transactions, such as through the customer's mobile phone number, or through some other external billing mechanism used by mobile community platform 202.

In step 409, mobile community platform 202 determines whether the verification code received in the verification code validation request from the third party provider is valid by comparing it to the verification code stored in the database of mobile community platform 202 for that customer identification code. If the two codes match, then the verification code is valid, and mobile community platform 202 sends a confirmation reply to the third party provider in step 411 to confirm that the verification code is valid. If the two codes do not match, then the verification code is not valid, and mobile community platform 202 sends an error reply to the third party provider in step 410 to advise that the verification code is not valid. The registration and activation process for the customer between the third party provider and mobile community platform 202 is then complete and ends.

In an exemplary embodiment of the invention, HTTP and XML are used to communicate between the third party provider and intermediary billing system of mobile community platform 202 in the steps described above. In particular, the registration request in step 404 is implemented with an HTTP POST, and can be passed with the following parameters:

ActionCode: 1 means to activate the customer;
2 means to confirm the verification code;
PartnerID: Assigned by mobile community platform to uniquely identify the third party provider (partner);
ProductID: Assigned by mobile community platform to uniquely identify the particular product involved in the transaction;
CustomerID: Customer identification code for the customer;
FirstName: First name of customer;
LastName: Last name of customer;
EmailAddress: Email address of customer;
Birthdate: Birthdate of customer;
Gender: Gender of customer;

Preferably, the ActionCode, PartnerID, ProductID, and CustomerID are required parameters.

An example of HTML for the registration request is shown below in Table 1:

TABLE 1

```
<html>
<head>
    <script type="text/javascript">
        function frmSubmit( ) {window.document.form1. submit( );}
    </script>
</head>
    <!-- Auto submit when body loads. -->
    <body LANGUAGE="JavaScript" onload="return frmSubmit( )">
    <form
        id="form1"
        name="form1"
        action="http://www.sms.ac/Directory/ppcoptin.aspx"
        method="POST">
        <input type="hidden" name="action" value="1">
        <input type="hidden" name="PartnerId" value="1234">
        <input type="hidden" name="ProductId" value="5678">
        <input type="hidden" name="CustomerId" value="test_user_01">
        <input type="hidden" name="FirstName" value="John">
        <input type="hidden" name="LastName" value="smith">
        <input type="hidden" name="EmailAddress"
            value="js@ExampleEmial.com">
        <input type="hidden" name="BirthDate" value="05/21/1977">
        <input type="hidden" name="Gender" value="M">
    </form >
</body >
</html>
```

Similarly, an HTTP POST is used in step 407 in which mobile community platform 202 directs the customer back to the third party provider along with the verification code, and the same parameter fields as discussed above. The URL to which the customer is directed back to is specified by the third party provider. An example of HTML for the redirect of step 407 is shown below in Table 2:

TABLE 2

```
<html>
<head>
    <script type="text/javascript">
        function frmSubmit( ) {window.document.form1.submit( );}
    </script>
</head>
    <!-- Auto submit when body loads. -->
    <body LANGUAGE="JavaScript" onload="return frmSubmit( )">
    <form
        id="form1"
        name="form1"
        action="http://www.MobilePartner.com/
        customerLandingPage.html" method="POST">
        <input type="hidden" name="vc" value=
        "EXAMPLE_VERIFICATION_CODE">
        <input type="hidden" name="PartnerId" value="1234">
```

TABLE 2-continued

```
        <input type="hidden" name="ProductId" value="5678">
        <input type="hidden" name="CustomerId" value="test_user_01">
        <input type="hidden" name="FirstName" value="John">
        <input type="hidden" name="LastName" value="Smith">
        <input type="hidden" name="EmailAddress"
            value="js@ExampleEmail.com">
        <input type="hidden" name="BirthDate" value="05/21/1977">
        <input type="hidden" name="Gender" value="M">
    </form>
</body>
</html>
```

In the same manner, the confirmation request of the verification code in step 408 is sent from the third party provider using an HTTP POST or an HTTP GET directly between the third party provider and mobile community platform 202, without involving the customer's browser. The parameter for ActionCode is set to "2" for customer confirmation. An example of HTML for the confirmation request of step 408 is shown below in Table 3:

TABLE 3

```
<html>
<head>
    <script type="text/javascript">
        function frmSubmit( ) {window.document. form1.submit( );}
    </script>
</head>
    <!-- Auto submit when body loads. -->
    <body LANGUAGE="JavaScript" onload="return frmSubmit( )">
    <form
        id="form1"
        name="form1"
        action="http://www.sms.ac/Directory/ppcoptin.aspx"
        method="POST">
        <input type="hidden" name="action" value="2">
        <input type="hidden" name="vc" value=
        "EXAMPLE_VERIFICATION_CODE">
        <input type="hidden" name="PartnerId" value="1234">
        <input type="hidden" name="CustomerId" value="test_user_01">
    </form>
</body>
</html>
```

In this regard, the result for the confirmation request is written by mobile community platform 202 as plain text to the output stream, and the possible return values for the result of the confirmation request are:

"Success: #CustomerID# has been verified"
"Error: bad 'CustomerID': #CID#"
"Error: bad 'vc': #VC#"
"Error: bad 'PartnerID': #PID#"
"Error: could not verify 'CustomerID': #CID#" or 'PartnerID': #PID#"

Figure 5:
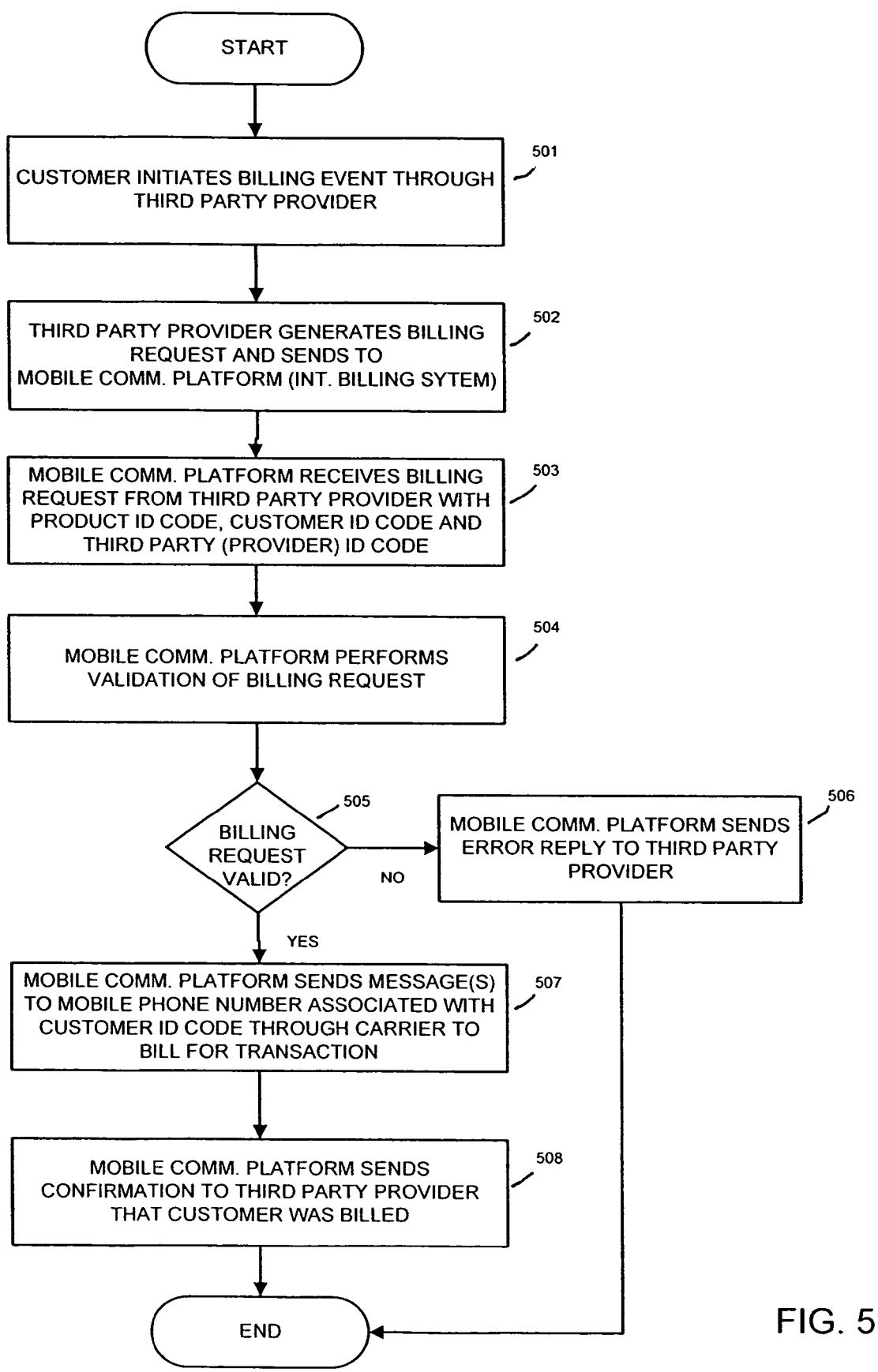
FIG. 5 is a flowchart for explaining the processing of a billing request for a transaction, according to one embodiment of the invention.

FIG. 5 is a flowchart that depicts the processing of a billing request for a transaction according to an exemplary embodiment, after the registration and activation process described above has been completed successfully. In FIG. 5, the process starts and proceeds to step 501 in which the customer initiates a billing event by requesting the product, such as premium content or services, for which the third party was registered and/or activated as described above with respect to FIG. 4. In step 502, the third party provider generates a billing request that includes the customer identification code, a product identification code for the product that is the subject of the transaction, and a provider identification code of the third party provider. Other parameters may also be included in the billing request.

Next, in step 503, mobile community platform 202 (intermediary billing system) receives the billing request described above and then performs validation of the billing request in step 504. The validation of the billing request is performed by determining whether the customer identification code in the billing request corresponds to a customer in the database of mobile community platform 202, and by determining whether the provider identification code in the billing request corresponds to a valid third party provider in the database of mobile community platform 202. If it is determined in step 505 that the billing request validation result is not valid, then the process proceeds to step 506 in which mobile community platform 202 sends an error reply to the third party provider, upon which the third party provider may refuse access to the product by the customer.

On the other hand, if it is determined in step 505 that the billing request validation result is valid, then the process proceeds to step 507 in which mobile community platform 202 sends at least one message, such as a premium SMS or other type of billable message, to the mobile phone number associated with the customer identification code in the database of mobile community platform 202. The message is sent from mobile community platform 202 through the carrier for the customer's mobile phone number, so that a billable amount associated with the message is billed to the customer's account with the carrier. In this manner, the transaction for a product between the customer and the third party provider is easily supported by mobile community platform 202 through the use of billable messages sent to the customer. The billing request from the third party provider may include a message text string which is then included in the message sent from mobile community platform 202 to the customer's mobile phone number. Such a text string may be used by the third party provider to thank the customer for the purchase, and possibly to confirm the details of the purchase, such as the product identification, the transaction price, etc.

In step 508, mobile community platform 202 sends a confirmation to the third party provider that the customer was billed, upon which the third party provider may enable access to the product by the customer. The billing process of FIG. 5 then ends.

Similar to the registration and activation process, the billing request of the invention may be formatted as XML and transmitted via an HTTP POST to a target URL set by mobile community platform 202. The POST parameter name is 'XML', which is an XML string that contains the following fields:

CommunityID: Root XML tag;
Authentication: Tag denotes the authentication section of the document;
TransmissionID: Unique identifier for the transmission;
PartnerID: Unique identifier for the third party provider (partner);
UserID: Community member name;
Password: Password of community member;
ProductID: Unique identifier for the product;
MessageText: Text to be included in premium message; and
CustomerID: Customer identification code for the customer.

Preferably, all of the above fields are required. An example of the XML for the billing request is shown below in Table 4:

TABLE 4

```
<?xml version="1.0" encoding="utf-16"?>
<SMSac xmlns="http://tempuri.org/SMSacXMLSample.xsd">
    <TransmissionId>234032832</TransmissionId>
    <Authentication>
```

TABLE 4-continued

```
        <MobilePartnerId>TestMPID</MobilePartnerId>
        <!--Required; Mobile Partner Username -->
        <UserId>TestUserID</UserId>
        <!--Required; SMS.ac Member Name -->
        <Password>Password1</Password>
        <!--Required; Password of your sms.ac account -->
    </Authentication>
    <UserOriginatedMessages>
        <UserOriginatedMessage>
            <ProductId>S678</ProductId>
            <!--Required; The ID of the Mobile Product -->
            <MessageText>
                Thank you for using www.MobilePartner.com
            </MessageText>
            <!--Required; The Text of the Message -->
            <CustomerId>test_user_01</CustomerId>
            <!--Required; The Customer that is to be charged -->
        </UserOriginatedMessage>
    </UserOriginatedMessages>
</SMSac>
``` and an example XSD for the request is shown below in Table 5:

TABLE 5

```
<?xml version="1.0"?>
<xs:schema id="NewDataSet" targetNamespace="sms.ac"
    xmlns:mstns="sms.ac"
    xmlns="sms.ac" xmlns:xs="http://www.w3.org/2001/XMLSchema"
    xmlns:msdata="urn:schemas-microsoft-com:xml-msdata"
    attributeFormDefault="qualified" elementFormDefault="qualified">
    <xs:element name="SMSac">
        <xs:complexType>
            <xs:sequence>
                <xs:element name="TransmissionId" type="xs:int"
                    minOccurs="1" maxOccurs="1"/>
                <xs:element name="Authentication" minOccurs="1"
                    maxOccurs="1">
                    <xs:complexType>
                        <xs:sequence>
                            <xs:element name="MobilePartnerId" type="xs:int"
                                minOccurs="1" maxOccurs="1" />
                            <xs:element name="UserId" type="xs:string"
                                minOccurs="1" maxOccurs="1" />
                            <xs:element name="Password" type="xs:string"
                                minOccurs="1" maxOccurs="1" />
                        </xs:sequence>
                    </xs:complexType>
                </xs:element>
                <xs:element name="userOriginatedMessages" minOccurs="0"
                    maxOccurs="1">
                    <xs:complexType>
                        <xs:sequence>
                            <xs:element name="userOriginatedMessage"
                                minOccurs="0" maxOccurs="unbounded">
                                <xs:complexType>
                                    <xs:sequence>
                                        <xs:element name="ProductId" type="xs:int"
                                            minOccurs="1" />
                                        <xs:element name="MessageText" type="xs:string"
                                            minOccurs="1" />
                                        <xs:element name="CustomerId" type="xs:string"
                                            minOccurs="1" />
                                        <xs:element name="ChargeType"
                                            default="Premium">
                                            <xs:simpleType>
                                                <xs:restriction base="xs:string">
                                                    <xs:enumeration value="Premium"/>
                                                    <xs:enumeration value="Standard"/>
                                                </xs:restriction>
                                            </xs:simpleType>
                                        </xs:element>
                                    </xs:sequence>
                                </xs:complexType>
                            </xs:element>
                        </xs:sequence>
                    </xs:complexType>
```

TABLE 5-continued

```
      </xs:element>
    </xs:sequence>
  </xs:complexType>
</xs:element>
<xs:element name="NewDataSet" msdata:IsDataSet="true"
    msdata:EnforceConstraints="False">
  <xs:complexType>
    <xs:choice maxOccurs="unbounded">
      <xs:element ref="SMSac" />
    </xs:choice>
  </xs:complexType>
</xs:element>
</xs:schema>
```

The possible response code for the billing request, include the error reply of step 506 and the confirmation of step 508 in FIG. 5. In this regard, the response codes are indicated of these replies are indicated by a "1" for success, and a "0" for failure (error). The response of "0" for failure can also include a failure message that provides a brief explanation of why the billing request failed.

Figure 6:
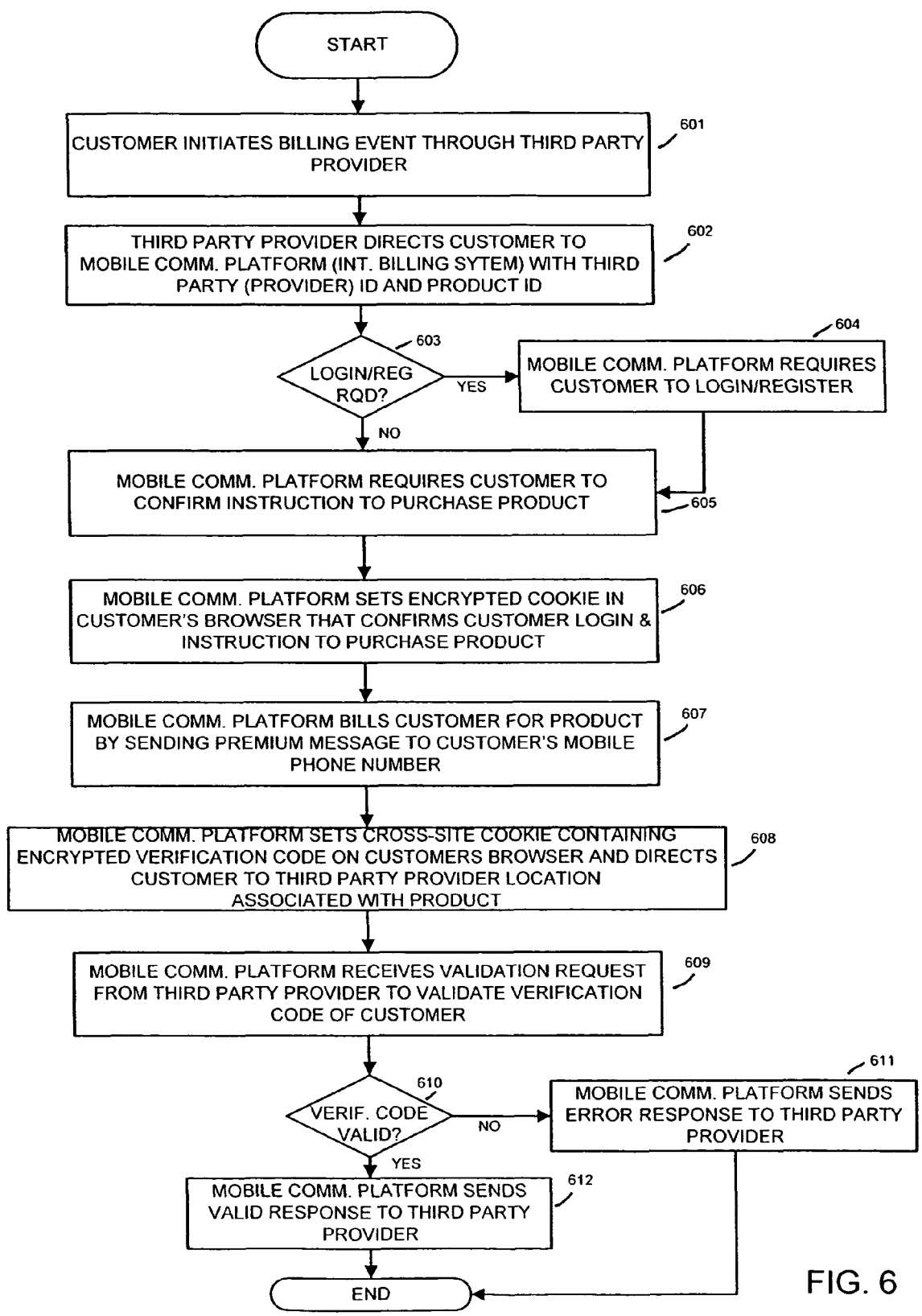
FIG. 6 is a flowchart for explaining the processing of a transaction, according to another embodiment of the invention.

FIG. 6 is a flowchart which provides another exemplary embodiment of processing a billing transaction according to the invention. As seen in FIG. 6, the process starts and proceeds to step 601 in which a customer initiates a billing event by selecting a product, such as premium content or services, offered through the third party provider. Then, in step 602, the third party provider directs the customer to mobile community platform 202 (intermediary billing system), along with a provider identification code for the third party provider and a product identification code for the product. This initiates the transaction activation process. In a particular embodiment, the customer is directed to mobile community platform 202 through the use of a hyperlink.

In step 603, mobile community platform 202 determines whether the customer needs to login, and register if not already registered. The customer does not need to login if the customer is registered and has previously been successfully through this process for the same product. If the login or registration is required, the process proceeds to step 605. On the other hand, if the login or registration is required, the process proceeds to step 604 in which the customer logs in to mobile community platform 202, or registers with mobile community platform 202 as described above in the embodiment of FIG. 4. Next, in step 605, mobile community platform 202 prompts the customer for a confirmation of an instruction to proceed with the transaction, and displays a description of the product (service or content) along with the price and possibly other information. Assuming the customer confirms the transaction, the process proceeds to step 606, in which mobile community platform 202 generates an encrypted cookie that indicates the customer has "opted in" (purchased) the product, and can therefore skip steps 603 to 606 in the future for transactions involving this particular product. The encrypted cookie is then placed in the customer's browser application.

In step 607, mobile community platform 202 bills the customer for the product by sending a premium message to the mobile phone number associated with the customer identification code for this customer in the database of mobile community platform 202. The billing value of the premium message corresponds to the transaction price for the product. In this manner, mobile community platform 202 easily handles the billing, which may often be a micro-transaction, for third party provider through the use of premium messages and the existing relationships between various mobile carrier systems and mobile community platform 202. Next, in step 608, mobile community platform 202 generates a verification code that indicates the customer has been billed for the transaction, encrypts the verification code, and places the encrypted verification code in a cookie on the customer's browser application. The verification code is also stored in the database of mobile community platform 202 in association with the customer identification code for this customer. Then customer is then directed back to the third party provider location (such as a website page) associated with the product of the transaction (this URL is specified by the third party provider).

The third party provider then accesses the cookie from the customer's browser application and obtains the encrypted verification code. In step 609, mobile community platform 202 receives a validation request from the third party provider, the validation request including a returned encrypted verification code that the third party provider obtained from the cookie in the user's browser, along with the customer identification code for this customer. Then, in step 610, mobile community platform 202 performs validation on the returned encrypted verification code by decrypting it and comparing it against the encrypted verification code that was previously generated by mobile community platform 202 for this transaction, and confirming that the customer has been successfully billed for this transaction. If the verification code is validated by mobile community platform 202, then flow passes to step 612 in which mobile community platform 202 sends a valid response to the third party provider. If, on the other hand, the verification code is not validated by mobile community platform 202, then flow passes to step 611 in which mobile community platform 202 sends an error response to the third party provider. The third party provider then determines whether to provide the customer with access to the product based on the validation response received from mobile community platform 202 (intermediary billing system). The process of FIG. 6 then ends.

Figure 7:
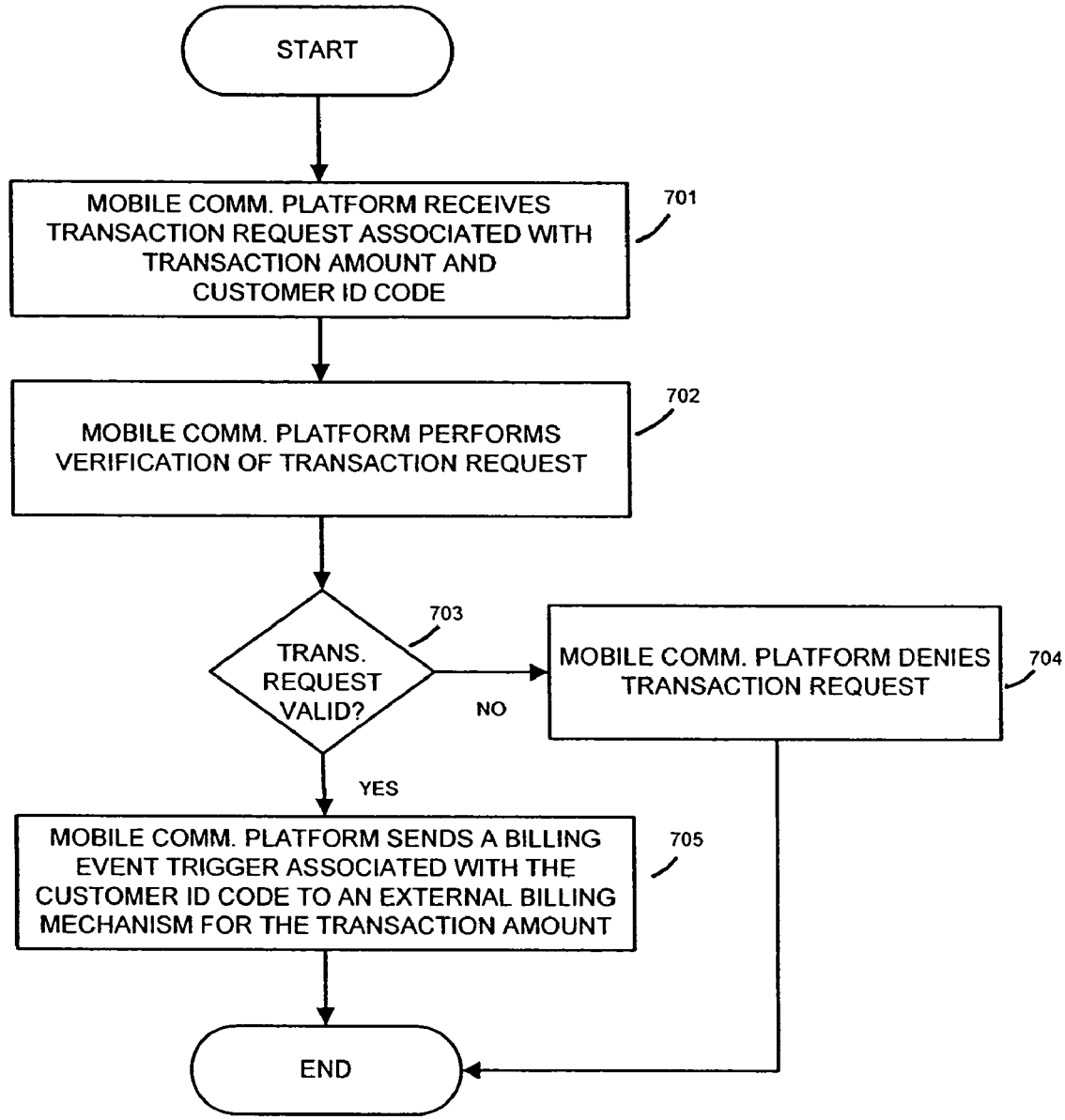
FIG. 7 is a flowchart for explaining the processing of a billing request for a transaction, according to another embodiment of the invention.

It can be appreciated that the invention may be carried out in various embodiments, in which some of the above described aspects may not be included. In this regard, FIG. 7 depicts a billing process according to another embodiment of the invention, in which the intermediary billing system may be standalone and can process transaction requests from any source for a customer and transaction amount, by using various types of external billing mechanisms and billing event triggers. In FIG. 7, the process begins at step 701 in which mobile community platform 202 (intermediary billing system) receives a transaction request, from any source internal or external to mobile community platform 202, that is associated with a customer identification code and a predetermined transaction amount. Mobile community platform 202 then performs validation of the transaction request in step 702. The validation of the transaction request is performed by determining whether the customer identification code in the transaction request corresponds to a previously-registered and activated customer in the database of mobile community platform 202. If it is determined in step 703 that the transaction request validation result is not valid, then the process proceeds to step 704 in which mobile community platform 202 denies the transaction request, the customer is not billed, and the process ends.

On the other hand, if it is determined in step 703 that the transaction request validation result is valid, then the process proceeds to step 705 in which mobile community platform 202 sends a billing event trigger to an external billing mechanism in order to effectuate billing of the customer for the transaction amount. The billing event trigger is associated with the customer identification code, and may actually contain the customer identification code, so that the external billing mechanism bills the correct customer for the transaction amount. The external billing mechanism can be any type of mechanism or system for billing the customer, such as the billing system of a mobile carrier for the customer's mobile phone (as discussed above), a credit card billing system, a prepaid card billing system, a web-based payment system, a bank account billing system, or any other billing system or mechanism to which mobile community platform 202 can interface and direct a billing event trigger for a customer. Mobile community platform 202 can simultaneously use several different external billing mechanisms, and may use one or several of them for each customer depending on the type of third party providers with which the customer conducts transactions. Accordingly, mobile community platform 202 acts as a virtual point-of-sale for third party providers to enable the payment for transactions through the use of one or more external billing mechanisms with which mobile community platform 202 has a pre-existing relationship for authorized use of the external billing mechanisms.

Similarly, the billing event trigger can be one of many different types and formats, depending on the external billing mechanism to which the billing event trigger is sent for the customer, and the pre-existing arrangement (if any) that mobile community platform 202 has with the external billing mechanism. For example, in the case that the external billing mechanism is the billing system of the mobile carrier corresponding to the customer's mobile phone number, then the billing event trigger can be a message, such as a premium SMS, MMS, or other type of billable message, that is sent from mobile community platform 202 to the customer's mobile phone number through the mobile carrier. In the alternative, other types of billing event triggers can be used with the external billing mechanism. For example, the billing event trigger sent to the mobile carrier billing system can be a billing record file which contains the transactions for a customer that will then be added to the customer's carrier bill by the mobile carrier billing system. As mentioned above, other types and forms of billing event triggers that can be used by mobile community platform 202 include messages such as SMS, MMS, email, file transfers, XML, HTTP, billing record transfers, or any other type of communication supported by the internet, encrypted or unencrypted.

The transaction request from the third party provider may include a message text string which is then included in the message sent from mobile community platform 202 to the customer's mobile phone number. Such a text string may be used to thank the customer for the purchase, and possibly to confirm the details of the purchase, such as the product identification, the transaction price, etc. The process of FIG. 7 then ends. It can be appreciated that the general billing system depicted in FIG. 7 provides a powerful, efficient and convenient way with which to bill customers for various types of transactions by using an existing interface between mobile community platform 202 and one or more external billing mechanisms.

While the present invention has been particularly described above with reference to the various figures and embodiments, it should be understood that the invention is not limited to the above-described embodiments. Various changes and modifications may be made to the invention by those of ordinary skill in the art without departing from the spirit and scope of the invention.

What is claimed is:

1. A method for billing a customer for a transaction between the customer and a third party provider, the method including:

a registration request receipt step of receiving, at the intermediary billing system, a registration request to register the customer;

a customer registration step of registering the customer in the intermediary billing system by providing a mobile phone number of the customer to the intermediary billing system, assigning a customer identification code to the customer, the customer identification code being shared with the third party provider, and associating the mobile phone number of the customer with the customer identification code assigned to the customer;

a billing request receipt step of receiving, at the intermediary billing system, a billing request from the third party provider, the billing request including a product identification code corresponding to a product associated with the transaction between the customer and the third party provider, a customer identification code assigned to the customer and a provider identification code corresponding to the third party provider;

a billing validation step of validating, in the intermediary billing system, the billing request by determining whether the customer identification code corresponds to a customer that is registered with the intermediary billing system, and by determining whether the provider identification code corresponds to a valid third party provider; and a billing step of sending, in the case that the billing request is validated, at least one billable message from the intermediary billing system to a mobile phone number associated with the customer identification code, the at least one message representing a billing value that corresponds to the product identification code.

2. The method according to claim 1, wherein, in the registration request receipt step, the registration request is received from the third party provider and includes a customer identification code generated by the third party provider.

3. The method according to claim 1, wherein, in the registration request receipt step, the registration request is received from the customer, and, in the customer registration step, the customer identification code is generated by the intermediary billing system.

4. The method according to claim 1, wherein the customer registration step further includes the steps of assigning the customer identification code included in the registration request to the customer in a database of the intermediary billing system, along with the customer's mobile phone number, activating the customer's mobile phone number for billing in the intermediary billing system, and sending a unique verification code from the intermediary billing system to the third party provider.

5. The method according to claim 4, the customer registration step further including a verification code validation step in which the intermediary billing system receives a verification code validation request containing a returned verification code from the third party provider, the intermediary billing system validates whether the returned verification code is the same as the unique verification code sent from the intermediary billing system to the third party provider, and, in the case that the returned verification code is not valid, an error message is returned to the third party provider, and in the case that the returned verification code is valid, a validity confirmation message is returned to the third party provider.

6. The method according to claim 1, wherein the third party provider is a third party website offering the product for a predetermined transaction amount, and the registration request is sent from the third party provider to the intermediary billing system in response to a selection of the product by the customer on the third party website, wherein, in the registration request receipt step, the customer is directed to a registration website of the intermediary billing system to provide the customer's mobile phone number to the intermediary billing system for registration and activation, and the intermediary billing system then directs the customer back to the third party website along with a verification code from the intermediary billing system.

7. The method according to claim 1, wherein the third party provider is a third party website offering the product for a predetermined transaction amount, and the transaction is initiated by the customer upon a selection of the product by the customer on the third party website.

8. The method according to claim 1, wherein the billing request further includes a provider password corresponding to the third party provider, and a message text string which is set by the third party provider for inclusion in the at least one message sent from the intermediary billing system in the billing step.

9. The method according to claim 1, wherein, in the billing validation step, an error message is sent by the intermediary billing system to the third party provider in the case that the billing request is not valid, and a billing confirmation message is sent to the third party provider in the case that the billing request is valid.

10. The method according to claim 1, wherein, in the billing step, a confirmation message is sent from the intermediary billing system to the third party provider to confirm that the customer was billed in accordance with the billing request.

* * * * *